US006940961B1

(12) United States Patent
Grewing et al.

(10) Patent No.: US 6,940,961 B1
(45) Date of Patent: Sep. 6, 2005

(54) METHOD AND SYSTEM FOR TRANSMITTING SERVICE-RELEVANT INFORMATION BETWEEN SEVERAL END-TO-END CONTROLLERS

(75) Inventors: Thomas Grewing, Berlin (DE); Mirko Henkel, Berlin (DE); Jochen Hinkelmann, Berlin (DE); Holm Wagner, Falkenrehde (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 10/130,079

(22) PCT Filed: Nov. 9, 2000

(86) PCT No.: PCT/DE00/03922

§ 371 (c)(1),
(2), (4) Date: May 10, 2002

(87) PCT Pub. No.: WO01/37582

PCT Pub. Date: May 25, 2001

(30) Foreign Application Priority Data

Nov. 21, 1999  (DE) ................................. 199 54 566

(51) Int. Cl.[7] ............................................. H04M 7/00
(52) U.S. Cl. .............................. 379/221.08; 379/220.01
(58) Field of Search ............................ 379/219, 220.01, 379/221.01, 207.02, 221.08–221.1, 229, 379/230

(56) References Cited

U.S. PATENT DOCUMENTS 5,771,284 A * 6/1998 Sonnenberg ............ 379/221.13
6,470,080 B2 * 10/2002 Perlmutter .................. 379/219
6,594,355 B1 * 7/2003 Deo et al. ................... 379/219

FOREIGN PATENT DOCUMENTS

EP  0 886 446  12/1998
EP  0 926 906  6/1999

OTHER PUBLICATIONS

Recommendations Q-1224 (Sep. 1997) Part 1.

* cited by examiner

Primary Examiner—Benny Tieu
(74) Attorney, Agent, or Firm—Bell, Boyd & Lloyd LLC

(57) ABSTRACT

A method and system for transmitting service-related information between a number of connection controllers, wherein the service-related information is transmitted directly between the connection controllers, such that the full range of functions of preexisting services is available at any time for complex services of an intelligent network in the use of which a number of connections with connection controllers in each case associated with them are used at least from time to time.

10 Claims, 1 Drawing Sheet

METHOD AND SYSTEM FOR TRANSMITTING SERVICE-RELEVANT INFORMATION BETWEEN SEVERAL END-TO-END CONTROLLERS

BACKGROUND OF THE INVENTION

In a connection-oriented communication network constructed as a telephone network, a multiplicity of connections, which are mainly set up for implementing the services offered, exist at any given time. In most cases, the services are used in a regulated manner, their use is also designated as call, via additional control mechanisms. These are constructed differently depending on the type of service. They can be implemented as central controller, as decentralized controller or as interconnected controllers.

The standard service of a telephone network, a call between two subscribers, is in most cases implemented via a connection. The control of this service is usually designed as distributed control; i.e., it is performed by control entities which are distributed over the switching facilities of the communication network. This type of control is also called call processing in the profession. Call processing performs the actions intended for the connection (e.g., connection set-up and release) and possibly also the translation of the protocols of supplementary services (e.g., calling party identification). For this purpose, an exchange of parameters, among other things, is also performed between the control entities, where the time of the exchange and the type of parameters are described in protocols specified for the respective actions and services. This exchange is only provided between those control entities which are associated with the same connection.

Complex services such as, for example, conferences between a number of subscribers, frequently require correspondingly extended control mechanisms. A model for implementing these additional mechanisms consists in the expansion of the telephone networks into so-called intelligent networks (IN). In this arrangement, the switching facilities, now also called service switching points (SSP), are supplemented by at least one service control point (SCP) which controls at least the parts of the complex services going beyond the standard services already provided by the switching facilities. This model is thus an interconnection of controllers. A control corresponding to this model is also called call party handling (CPH) in the profession. Depending on the type of service to be controlled, different service-specific controls are implemented in this model.

A service-specific control is described in International ITU Standard Q.1224 "Distributed Functional Plane for Intelligent Network Capability Set 2", 09/97, and is called a Connection View Model. The basis for this model is a service which is implemented at least from time to time by two isolated part-connections, also called call segments. These call segments are usually implemented as standard services and, in consequence, controlled by completely separate controllers; i.e., each call segment is controlled by an associated call processing function. Such call processing associated with a call segment will be called call segment processing in the further text.

In addition, this model enables 1. a number of connections (also called call segments, if necessary, in the text which follows) to be connected together and separated to form a uniform end-to-end connection, also called "call",
2. announcements and tones to be applied during the setting-up and/or the existence of the connections, and
3. connections to be set up which are initiated by the service control point (SCP).

The connection view model will be explained in the text which follows, using the Secure Answer service as an example. In this service, an announcement that the called subscriber is currently entering an identification in order to authenticate himself/herself is transmitted to the calling subscriber 318 during the setting-up of a call. After the successful authentication, the call segments are connected together. To the subscribers, the call appears as a unit even though it is controlled by a number of separate call segment controllers at least from time to time since the following two call segments are already set up during the setting-up:

1. between the calling subscriber and the entity transmitting the announcement, which is controlled by a first call segment controller, and
2. between the called subscriber and the entity carrying out the authentication, which is associated with a second call segment controller.

According to this model, the call segment controllers involved are usually coordinated by a coordination function provided in the SCP.

If, however, a call is initially set up with two segments and then connected together, many of the supplementary services cannot be used in this approach to a solution since no transmission of parameters between connection controllers associated with different connections is provided. The following table contains a selection of services affected and names the originating parameters for these in each case.

| Service | Required parameter |
| --- | --- |
| Calling Line Identification (CLIP) | Calling Party Number |
| Malicious Call Identification (MCID) | Calling Party Number |
| Connected Line Identification Presentation (COLP) | Connected Line Identity Request Indication Connected Number |
| Call Forwarding (CF) | Redirecting Number Original Called Party Number Redirection Information |
| Closed User Group (CUG) | Closed User Group Indicator |
| Call Hold (HOLD) | Hold Retrieve |
| Terminal Portability (TP) | Suspend Resume |
| Generic Services | Generic Notifications |
| Call Waiting (CW) | User-to-User Information(UUI) |
| User-to-User Signaling (UUS) | CCBS possible indicator |
| Completion of calls to busy subscriber (CCBS) | CCNR possible indicator |
| Completion of calls on no reply (CCNR) | |
| Conferences (*) | Backward Conference Treatment Indicator |

(*) the information for dealing with conferences may be received by other SCPs in a correspondingly configured intelligent network.

In International ITU Standard Q.1228, "Interface Recommendation for intelligent network Capability Set 2", 09/97, an Intelligent Network Application Protocol (INAP) is described, with the aid of which some of the set parameters can be transferred between the call segment controllers.

In this arrangement, the transfer of the parameters between the call segment controllers is always performed via the SCP and is provided for the following services or parameters, respectively:

| Service | Required parameter |
|---|---|
| Calling Line identification (CLIP) | Calling Party Number |
| Malicious Call Identification (MCID) | |
| Call Forwarding (CF) | Redirecting Number |
| | Original Called Party Number |
| | Redirection Information |

In this arrangement, the transfer of parameters is specified separately for each parameter in the INAP. Thus, the INAP must be adapted for each additional parameter which is introduced in the telephone network if it is intended to exchange the parameter between call segment controllers. At present, the INAP does not provide any support for the following services; i.e., the parameters cannot be transferred in at least one direction and the associated services thus cannot be used:

| Service | Required parameter |
|---|---|
| Connected Line Identification Presentation (COLP) | Connected Line Identity Request Indicator |
| | Connected Number |
| Closed User Group (CUG) | Closed User Group Indicator |
| Call Hold (HOLD) | Hold |
| | Retrieve |
| Terminal Portability (TP) | Suspend |
| | Resume |
| Generic Services | Generic Notifications |
| Call Waiting (CW) | User-to-User Information (UUI) |
| User-to-User Signaling (UUS) | CCBS possible indicator |
| Completion of calls to busy subscriber (CCBS) | CCNR possible indicator |
| Completion of calls on no reply (CCNR) | |
| Conferences | Backward Conference Treatment Indicator |

The present invention is, therefore, directed toward improving the method for transferring parameters between connection controllers.

SUMMARY OF THE INVENTION

A key aspect of the present invention consists in a method for transmitting service-related information between at least two different connection controllers, in which the service-related information is transmitted directly between the connection controllers. In the text which follows, some essential advantages of the present invention will be mentioned:
Unwanted restrictions in the familiar spectrum of services of the subscriber are avoided;
the closed user group, connected line identification presentation services, indicators for call hold and terminal portability and the generic services are supported even when complex services implemented by the SCP are used;
there are no elaborate analyses, implementations and adaptations of the INAP for each new service;
because of the generic SSP internal parameter transfer according to the present invention, IN service developers only need to implement desired restrictions of the full support for the calling line identification and call forwarding services.

According to a further embodiment of the method according to the present invention, it is provided that at least parts of the service-related information are temporarily stored in a transmitting connection controller before they are transmitted to a receiving connection controller. Thus, the time of transmission can be flexibly controlled. It takes place, for example, after the call segments have been connected together.

According to another embodiment of the method according to the present invention, the temporarily stored service-related information is semantically checked and, if necessary, deleted when further service-related information arrives. In particular, those service-related information items temporarily stored are deleted which contradict the further service-related information and/or become meaningless as a result of that information. This minimizes the extent of the information to be transmitted and of the processing in the receiving connection controller and ensures semantically correct information for the telephone service subscriber. For example, a temporarily stored information item HOLD is deleted when an information item RETRIEVE is received since the subscriber is no longer on hold; i.e., it is no longer required to transmit and process the two information items.

According to a further embodiment of the method according to the present invention, the service-related information is temporarily stored in the transmitting connection controller at least until the receiving connection controller is generated. This prevents a loss of information in the case of such time delays. For example, the call number of a first subscriber initiating a Secure Answer service with a first connection is temporarily stored while the SCP initiates the setting-up of a second connection to the called second subscriber. After transmission of the temporarily stored information according to the present invention, the call number of the first subscriber is indicated to the second subscriber in this arrangement.

According to another embodiment of the method of the present invention, the transmitting connection controller transmits the service-related information at the latest after a service has been performed which is to be effected with the aid of the connection associated with the receiving connection controller. Thus, in the previous example, the call number of the second subscriber is only indicated to the first subscriber when his/her identity has been ascertained.

According to a further embodiment of the method according to the present invention, it is provided that during the coordination of the connection controllers by at least one coordination function implemented in a higher-level service control point, this coordination function can change the transmitted service-related information at any time. Thus, the previous semantics of SCP protocols, such as the INAP, remain untouched with a corresponding translation of the method according to the present invention; i.e., SCP and the method according to the present invention are compatible without restrictions.

According to yet another embodiment, the service-related information is transmitted between the connection controllers in each case within a switching facility. The transmission can, thus, be effected particularly effectively, such as by transmitting a pointer to the stored information. The particular advantage of this is that time-consuming and resource-consuming copying of the information is avoided.

Additional features and advantages of the present invention are described in, and will be apparent from, the following Detailed Description of the Invention and the Figures.

DETAILED DESCRIPTION OF THE INVENTION

Figure 1:
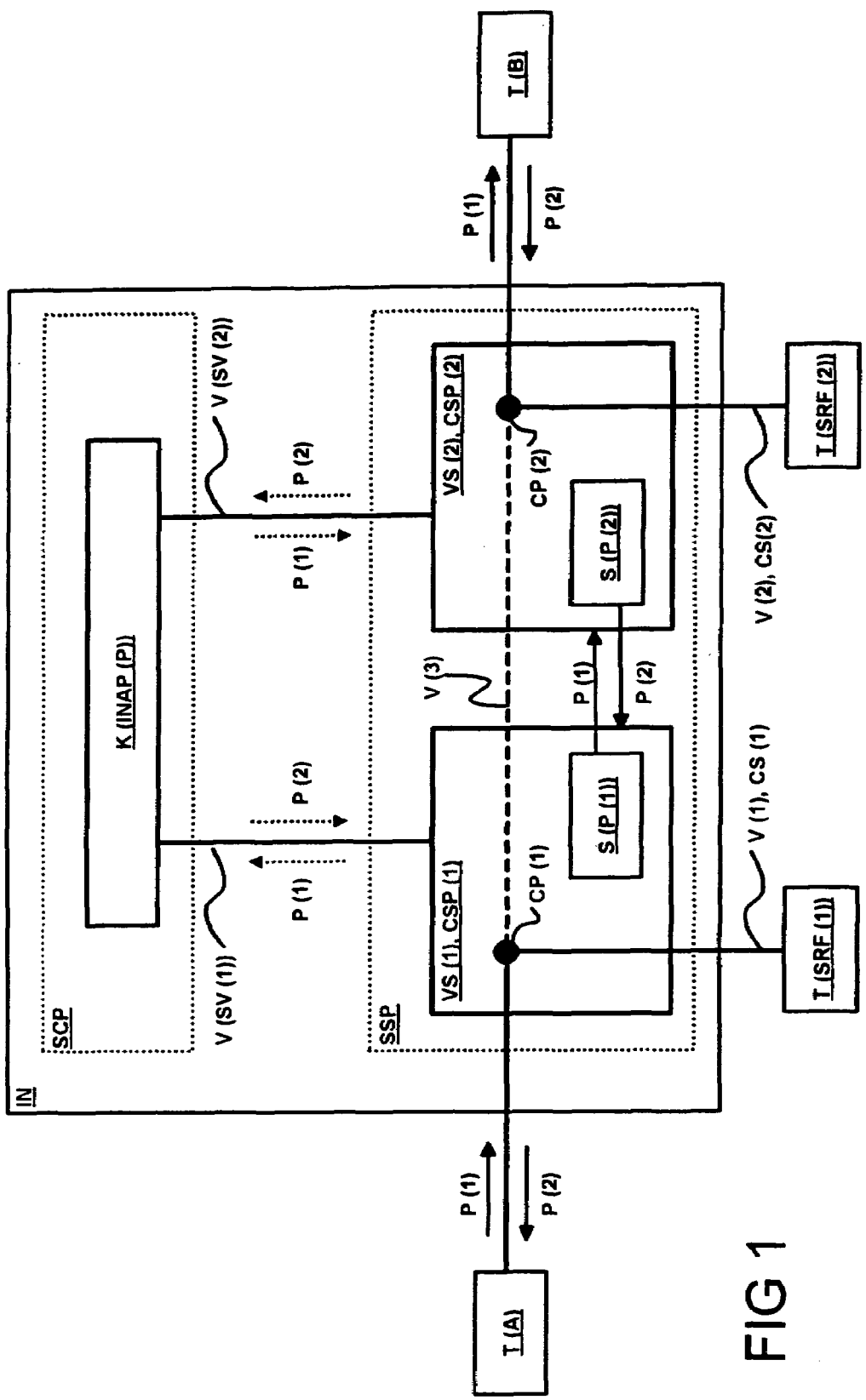
FIG. 1 shows an exemplary communication system in accordance with the teachings of the present invention in block diagram form.

As shown in FIG. 1, the communication system is constructed as an exemplary intelligent network IN with a service control point SCP and a service switching point SSP, also called switching facility SSP. The service switching point SSP is connected to a number of subscribers T which are constructed as calling subscriber A, as called subscriber B, as first special resource function SRF (1) and as second special resource function SRF (2). Between the calling subscriber A and the first special resource function SRF (1), a first connection V (1) (also called first call segment CS (1)) exists at least from time to time and is associated with a first connection controller VS (1) (also called first call segment processor SCP (1)) in the service switching point SSP, the first connection V (1) being switched by the former in a first connection point CP (1). In addition, a second connection V (2) (also called second call segment CS (2)) exists between the called subscriber B and the second special resource function SRF (2), at least from time to time, which second connection is associated with a second connection controller VS (2) (also called second call segment processor (2)) in the service switching point SSP, the second connection V (2) being switched by the former in a second connection point CP (2). By connecting together the two call segments CS, a third connection V (3) can be set up via which the calling subscriber A is connected to the called subscriber B, the connecting together being indicated by a partially dashed representation of the connection V (3) in FIG. 1. The connecting together to form the connection V (3) occurs, for example, by diffusing the two call segments CS (1), CS (2) together or by connecting the two connection points CP (1), CP (2), retaining the two call segments CS (1), CS (2).

The two call segment processors CSP are coordinated by the service control point SCP. For this purpose, at least one coordination function K is provided in the latter, which, for example, is constructed in accordance with the intelligent network application protocol INAP. The coordination function K and the call segment processors CSP are connected to one another by connections V, connection V between the first call segment processor CSP (1) and coordination function K being constructed, for example, as first signaling connection SV (1) and the one between the second call segment processor CSP (2) and the coordination function K being constructed as second signaling connection SV (2).

On all connections V, service-related information P is transmitted in addition to other items. This information also will be called parameter P in the present exemplary embodiment but is not restricted to this term; i.e., any equivalent representation of the service-related information P is provided for. In the present example, the calling subscriber A sends first parameters P (1) and the called subscriber B sends second parameters P (2). An exchange of some of these parameters P between the call segments CS is effected by the coordination function K in contemporary interconnected controllers implemented in accordance with the prior art initially described. This option is indicated by dashed arrows between the call segments CS and the coordination function K. According to the present invention, the parameters P may be exchanged directly between the call segment processors CSP. In the call segment processors CSP, a storage area, constructed, for example, as memory S, in which the parameters P are temporarily stored at least from time to time, is optionally provided.

The indicated, non-distributed implementation of the connection controllers VS in a single service switching point SSP and of the coordination function K to form a single service control point SCP only represent a particularly advantageous variant. In principle, any other implementations are possible such as, for example, a distributed implementation of the connection controllers VS in different service switching points SSP. This flexibility is indicated in FIG. 1 by a dotted representation of the service switching point SSP and of the service control point SCP.

For the exemplary embodiment, the present invention will be represented by the example of the "Secure Answer" service provided in intelligent networks IN. In this service, the identity of the called subscriber is checked before each call in order to deliver calls only to a particular person at a set which is accessible to everyone. In this service, the calling subscriber A is first connected by the first call segment CS (1) to the first specific resource function SRF (1), constructed, for example, as an announcement, while the second subscriber B is called with the aid of the second call segment CS (2) generated on instruction by the coordination function K. As soon as the second subscriber B has identified himself/herself, the two call segments CS (1), CS (2) are connected together.

In this process, first parameters P (1) received from the first subscriber A are temporarily stored in the first call segment processor CSP (1) at least until the second call segment processor CSP (2) is generated. These first parameters P (1) are constructed, for example, as calling party number, redirecting number, original call party number, redirection information, closed user group call indicator, connected line identity request indicator or as additional calling party number.

Once the second call segment processor CSP (2) has been generated, the parameters stored in the first call segment processor CSP (1) are transmitted directly to the second call segment processor CSP (2) and used for setting up the second call segment CS (2). The coordination function K is left with all capabilities, described in International ITU Standard Q.1600 "Signaling system No. 7—Interaction between ISUP and INAP", 09/1997, for changing the parameters P transmitted in accordance with the present invention.

Following the setting-up of the second call segment CS (2), the second subscriber B is authenticated in accordance with the Secure Answer service. For this purpose, the second specific resource function SRF (2), for example, is constructed as authentication function. The second parameters P (2) received from the second subscriber B in the second call segment CS (2) during this period, are temporarily stored by the second call segment processor CSP (2) until the Secure Answer service, which is the purpose of the connection V (2); or the authentication of the second subscriber B, has been effected. The second parameters P (2) are constructed, for example, as hold, suspend, generic notifications, redirection number, redirection number restriction, conference treatment indicator (backward), connected number or as additional connected number.

Each time a second parameter P (2) is received, a semantic check of the parameters P (2) already temporarily stored in the memory of the second call segment processor CSP (2) is optionally effected. If, for example a parameter RETRIEVE is received after the parameter HOLD or a parameter RESUME is received after the parameter SUSPEND, both parameters are deleted in each case.

After the successful authentication of the second subscriber B, at the latest, the two call segments CS (1), CS (2) are connected together and the second parameters P (2) temporarily stored in the second call segment processor CSP (2) are forwarded to the first call segment processor CSP (1) and from this to the first subscriber A in most cases. After CS (1) and CS (2) are connected together, the connection V (3) is set up between the two subscribers A and B.

Thus, the present invention produces particularly nice advantages in the intelligent network IN, particularly when using the connection view model. However, it can be used in any communication network in which a transmission of service-related information P between connection controllers VS according to the present invention is required.

Indeed, although the present invention has been described with reference to specific embodiments, those of skill in the art will recognize that changes may be made thereto without departing from the spirit and scope of the invention as set forth in the hereafter appended claims.

What is claimed is:

1. A method for transmitting service-related information between at least two different connection controllers, the method comprising:
   providing that the at least two different connection controllers be implemented in a distributed manner;
   providing that each of the at least two different connection controllers controls a connection which is respectively allocated to it; and
   transmitting the service-related information directly between the at least two different connection controllers.

2. A method for transmitting service-related information as claimed in claim 1, the method further comprising the step of storing, temporarily, at least parts of the service-related information in a transmitting connection controller before being transmitted to a receiving connection controller.

3. A method for transmitting service-related information as claimed in claim 2, the method further comprising the steps of checking, semantically, the temporarily stored service-related information and, if necessary, deleting the temporarily stored service-related information when further service-related information arrives.

4. A method for transmitting service-related information as claimed in claim 3, the method further comprising the step of deleting at least those temporarily stored service-related information items which at least one of contradict the further service-related information and become meaningless as a result of the further service-related information.

5. A method for transmitting service-related information as claimed in claim 2, wherein the service-related information is temporarily stored at least until the receiving connection controller has been generated.

6. A method for transmitting service-related information as claimed in claim 2, wherein the transmitting connection controller transmits the service-related information at a latest after a service has been performed which is to be effected with the aid of the connection associated with the receiving connection controller.

7. A method for transmitting service-related information as claimed in claim 1, wherein, during the coordination of the connection controllers by at least one coordination function implemented in a higher-level service control point, the coordination function can change the transmitted service-related information at any time.

8. A method for transmitting service-related information as claimed in claim 1, wherein the service-related information is transmitted between the connection controllers, in each case, within a switching facility.

9. A method for transmitting service-related information as claimed in claim 1, wherein the controlled connections are constructed as call segments which are set up at least from time to time during utilization of a service of an intelligent network.

10. A connection controller, comprising:
    parts for controlling a connection which is respectively allocated to the connection controller; and
    parts for transmitting service-related information directly between the connection controller and a further connection controller, wherein the further connection controller controls a connection which is respectively allocated to the further connection controller, and the connection controller and the further connection controller are implemented in a distributed manner in an intelligent network.

* * * * *